UNITED STATES PATENT OFFICE.

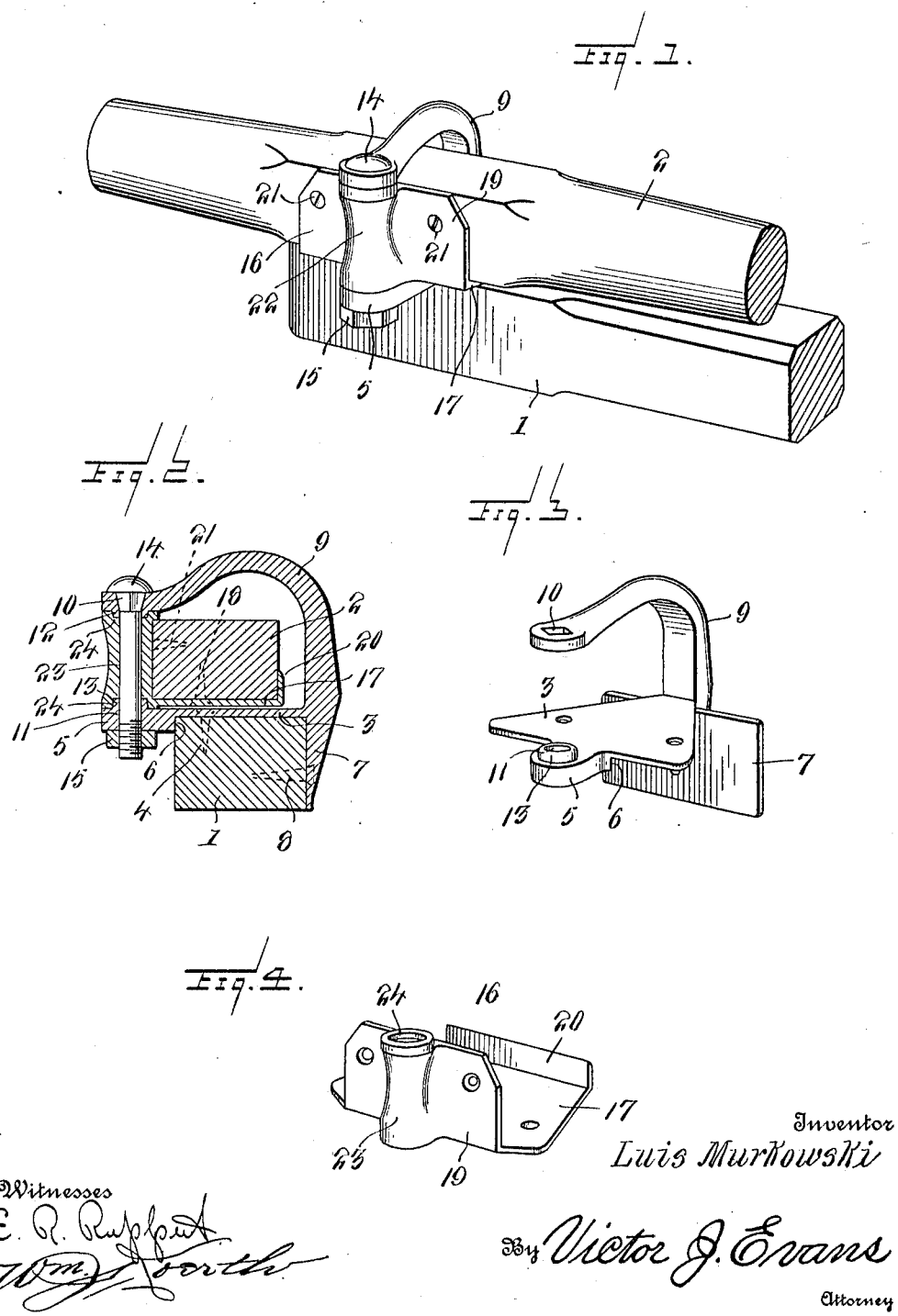

LUIS MURKOWSKI, OF ENUMCLAW, WASHINGTON.

SWINGLE AND DOUBLE TREE ATTACHMENT.

1,096,742.

Specification of Letters Patent. Patented May 12, 1914.

Application filed July 26, 1911. Serial No. 640,545.

*To all whom it may concern:*

Be it known that I, LUIS MURKOWSKI, a citizen of the United States, residing at Enumclaw, in the county of King and State of Washington, have invented new and useful Improvements in Swingle and Double Tree Attachments, of which the following is a specification.

This invention relates to certain novel improvements in connections for swingle and double trees of vehicles.

In carrying out my invention, it is my purpose to provide a connection of this class which obviates the necessity of boring holes through the swingle tree and double tree for the reception of the connecting bolt which, as is well known, materially lessens the strength of both the swingle and double tree and as a consequence causes either of the trees to break at their point of connection.

Another object of the invention is to provide a connection of this class wherein all the strain of the pull of the vehicle is relieved from the swingle tree at its point of connection with the double tree, and as well as reinforcing the double tree at its point of connection with the swingle tree.

Another object of the invention is to provide both the swingle and double trees with wear plates, and a pivoted connection which is of such a nature as to sustain the plates to prevent the contacting of the said wear plates when either the swingle or double tree is swung.

With the above recited objects and others of a similar nature in view, the invention consists in the construction, combination and arrangement of parts set forth in and falling within the scope of the appended claim.

In the accompanying drawings: Figure 1 is a perspective view showing a swingle tree attached to a double tree by my improved coupling. Fig. 2 is a vertical sectional view through the coupler used in connection with the invention. Fig. 3 is a perspective view of the coupling member to be secured to the doubletree; Fig. 4 is a perspective view of the coupling member to be secured to the swingle tree.

Referring now to the accompanying drawings in detail and particularly to Figs. 1–3 thereof, the numeral 1 designates a double tree and 2 a swingle tree for the double tree. 3 indicates a plate which is provided with suitable openings adapted for the reception of screws 4 whereby the said plate is sustained upon the double tree 1. The plate 3 is centrally formed with a reduced projection or ear 5, the said ear having an upper face in a plane parallel with the plate 3, but the said ear is of a greater thickness than the plate 3, so as to provide a shoulder 6 which engages with the outer face of the double tree 1. The plate 3 has its rear end integrally formed with an offset portion 7, the latter being arranged substantially at a right angle to the plate proper, and the said offset portion is flattened and extended a suitable distance beyond the sides of the said plate adjacent the rear end thereof. This flattened depending portion 7 is adapted to engage with the rear face of the double tree 1, and the said portion 7 is provided with one or more suitable openings, each of said openings being adapted to receive securing elements, such as screws 8. Obviously with my improved coupler, the bolt 14 does not penetrate either the swingle tree or double tree so that neither of the said members are weakened by the same. Integrally formed with the plate 3 at its juncture with its offset or depending portion 7 is a clevis or strap iron 9, the same having its terminal arranged in a plane parallel to that of the ear 5. The clevis 9 has its extremity formed with an opening 10, the said opening coinciding with a similar opening 11 provided in the ear 5, and the said openings pass through registering bosses 12 and 13 provided upon the under face of the clevis 9 and the upper face of the ear 5 respectively. The opening 10 in the end of the clevis is preferably angular, so that the walls thereof will contact with the angular portion of a headed bolt 14. The threaded portion of the bolt 14 passes through the opening 11 of the ear 5, and the said threaded portion is secured to the clevis and ear through the medium of a suitable nut 15.

The numeral 16 designates the coupling member for the swingle tree. This coupling member comprises a base plate 17 having suitable openings for the reception of securing elements 18 which enter the outer face of the swingle tree. The base plate 17 has both of its opposite ends upset to provide the longitudinally extending plate 19 and the longitudinally extending lip 20. Both the lip and the plate are arranged at a right angle to the face plate 17 and the space between the lip and plate is sufficient to snugly as well as tightly engage with the upset faces of the swingle tree. The lip 20 preferably has its upper end sharpened so that the same will bite the inner face of the swingle tree 2. A plate 19 is provided with suitable openings, the same being adapted to receive securing elements such as screws 21. The plate 19 is centrally provided as well as integrally formed upon its outer face with a sleeve 22, the said sleeve having a suitable bore through which the bolt 14 passes. The bore 23 is of a diameter sufficient to snugly engage with the bolt, while the upper and lower portions of the said sleeve 22 are formed with enlarged pockets 24 which communicate with the bore 23 and which are adapted to receive the bosses 12 and 13 of the clevis 9 and the ear 5 respectively.

From the above description, taken in connection with the drawings, it will be noted that my improved couplings effectively reinforce the elements to which they are attached, it being understood that the clevis 9 is sufficiently resilient to permit its boss 12 to be forced snugly into engagement with the pockets provided upon the sleeve 22 of the member 16, and it will thus be seen that the plates 3 and 17 need not contact with each other, and also that the clevis serves as means for limiting the swinging movement of the swingle tree upon the double tree.

This device provides a strong, effective and durable connection for swingle and double trees or for double trees and tongues, but at the same time provides a substantial antifrictional as well as an anti-rattling connection. The sleeve for the double plate may, if desired, be provided with the usual hammer strap.

Having thus fully described the invention, what I claim is:—

The combination with a double tree and a swingle tree, of a coupling therefor comprising an angular shaped plate arranged to engage the upper and rear faces of said double tree, one member of said plate being extended in advance of the double tree and formed to provide an apertured ear bearing against the outer face thereof, a second plate of substantially U-form arranged to engage the bottom, front and rear faces of said swingle tree, a front vertical member of said plate being centrally formed with a sleeve arranged above the first mentioned plate, a clevis extending upwardly from the first mentioned plate and terminating to provide a bolt opening registering with the openings of said sleeve and ear, a pivot bolt connecting the said parts, and said sleeve having a depending flange bearing against said ear to retain the adjacent horizontal portions of each of the said plates in spaced relation.

In testimony whereof I affix my signature in presence of two witnesses.

LUIS MURKOWSKI.

Witnesses:
R. D. TAYLOR,
C. A. NEUMAN.

Copies of this patent may be obtained for five cents each, by addressing the "Commissioner of Patents, Washington, D. C."